Figure 1:
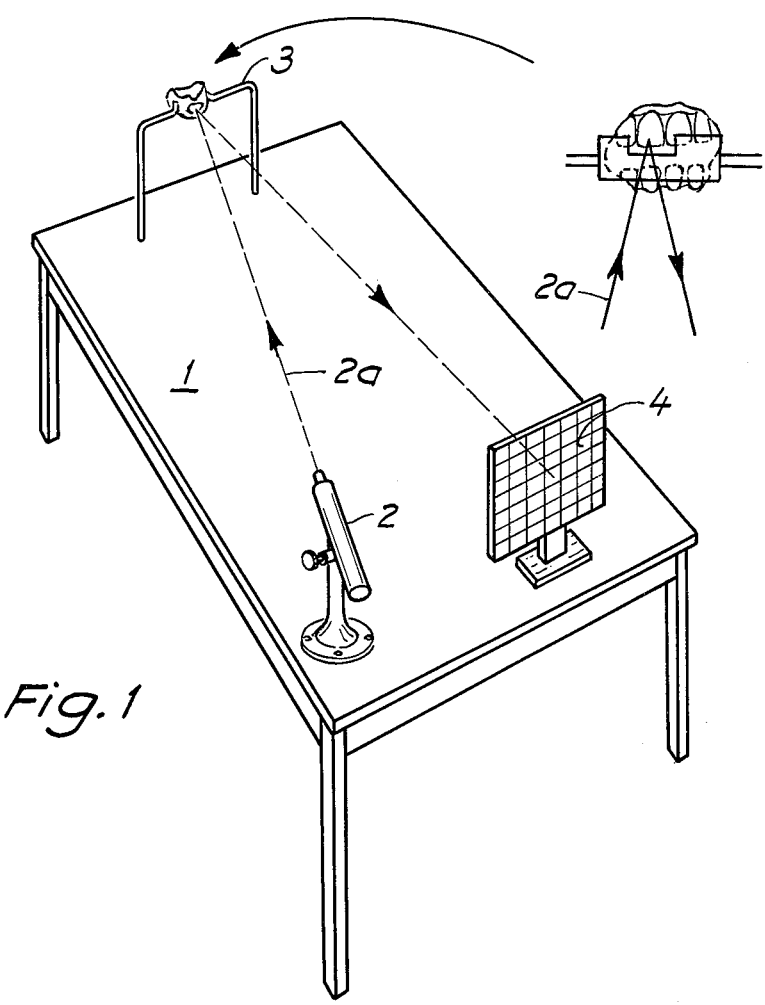

United States Patent [19]
Ryden et al.

[11] 3,875,420
[45] Apr. 1, 1975

[54] DEVICE FOR MEASUREMENT OF THE DISPLACEMENT OF A TOOTH

[75] Inventors: Hans Ryden; Hans Ingmar Bjelkhagen, Sweden; Nils H. L. Abramson, all of Stockholm, Sweden

[73] Assignee: said Bjelkhagen and said Abramson to said Ryden, Stockholm, Sweden

[22] Filed: Sept. 24, 1973

[21] Appl. No.: 400,166

[30] Foreign Application Priority Data
Sept. 25, 1972 Sweden.......................... 12322/72

[52] U.S. Cl. ................................. 250/578, 32/14 E
[51] Int. Cl. ............................................. G02f 1/28
[58] Field of Search....... 32/14 E, 19; 356/154, 152; 250/578; 351/7

[56] References Cited
UNITED STATES PATENTS
3,196,453  7/1965  Taylor..................................... 351/7
3,782,364  1/1974  Watt................................... 351/7 X Primary Examiner—James W. Lawrence
Assistant Examiner—Davis L. Willis
Attorney, Agent, or Firm—Christen & Sabol

[57] ABSTRACT

The present invention relates to a device to make possible measurement of the movability and displacement of a tooth and/or teeth. The invention utilizes a source, generating an electromagnetical propagation, for instance laser beams or the like while the tooth is held at a fixed position in relation to the source and to means, registrating the reflections of the source in the tooth.

6 Claims, 5 Drawing Figures

DEVICE FOR MEASUREMENT OF THE DISPLACEMENT OF A TOOTH

At correction of irregularities of the teeth it is well known that a displaced tooth and/or teeth tend to resume their former positions in the jaw. In order to reduce or prevent this motion, the patient, especially at night, may use a bite splint or other fixation means, which will keep the tooth or the teeth in the corrected position. In connection with this process it is desirable to be able to determine when the displacement of the tooth and the teeth, respectively, has come to an end, in order that the fixation means then can be dispensed with. Further it can be expected that the dental motion of certain patients is so small that any fixation means are unnecessary. It is of great importance to know the mobility of a tooth or of teeth, especially at periodontclasia. In order to determine the mobility a tooth is charged by a predetermined force, and the degree of mobility is determined by evaluation and registration of the tooth displacement, caused by the force.

As there are at hand different fields of applications where the determination of the magnitude of the dental displacement is of interest to study, this has been subject to development work, anyhow without resulting in any simple and effective measurement means.

The present invention is related towards a device for measurement of the displacement of a tooth, which device partly is using prior art and partly is based on experience, essentially facilitating the utilization of this technique.

The main characteristics of a device according to the present invention are stated in the characterising part of the claim 1, following the specification.

Figure 4:
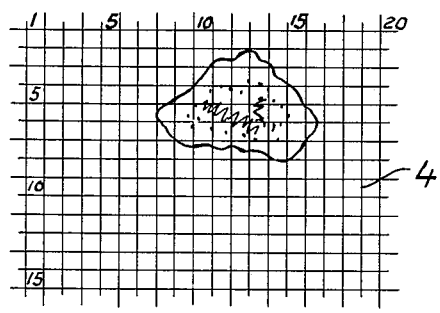
Figure 5:
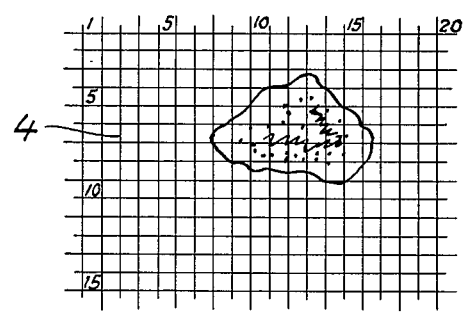
Figure 2:
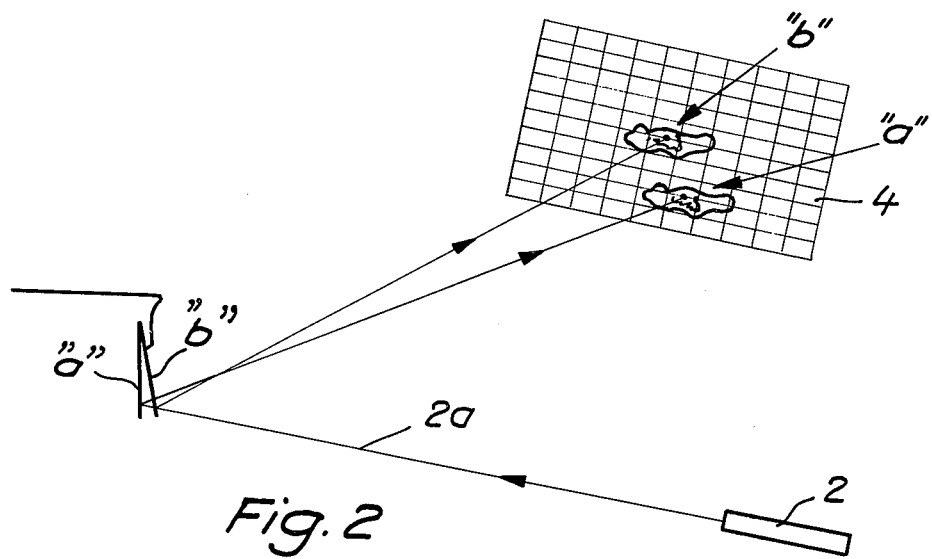
Figure 3:
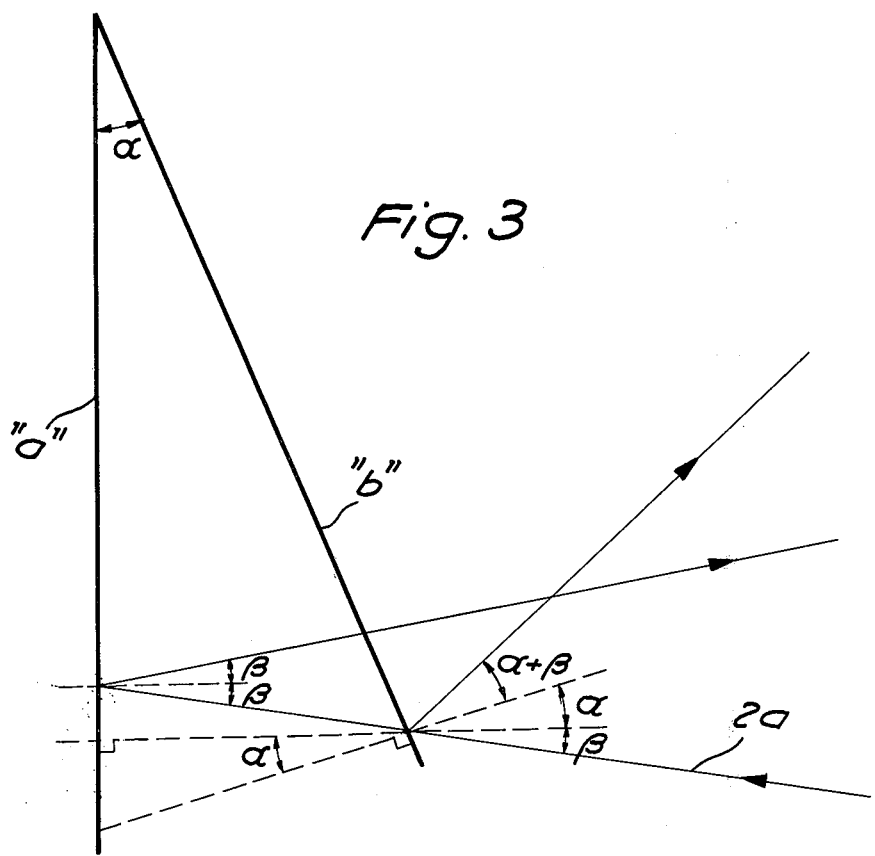

A presently suggested embodiment showing significative characteristics of the present invention is more closely described with reference to the attached drawing where FIG. 1 shows in perspective view the principal construction of the device for measurement of the displacement of a tooth, FIG. 2 shows schematically the application of the device according to FIG. 1, FIG. 3 shows the angular geometry applicable in the present embodiment, FIG. 4 shows a first reflection picture obtained from a tooth surface by a laser beam and FIG. 5 shows a second similar reflection picture.

The device according to the present invention is intended to be utilized for measurement for the displacement of a tooth and it makes use of a stand 1, on which stand there is a source 2, which in the illustrated embodiment comprises a source for generation of a laser beam. It should in this connection be noted that the source principally might be an arbitrary source for the generation of an electromagnetic propagation, yet have practical experiments till now shown that a sufficient reflection picture is obtained by a laser beam.

A condition for the practical application of the device further is that the tooth is given a fixed position in relation to the source 2. For this purpose there is a fixture 3. If a tooth of the upper jaw should be subject to measurement it would be completely sufficient that the fixture 3 comprises a upper jaw impression of the patient and in which fixture the upper jaw is fixed. If a tooth of the lower jaw should be subject to measurement it would be necessary to construct the fixture 3 having upper jaw impression as well as lower jaw impression in order that the lower jaw should be fixed in relation to the upper jaw. In the latter case the fixture 3 will show an exact complete tooth impression. By this procedure it is secured that front teeth, of special interest and expressed for measurement are given a fixation in relation to the molars and the stand. This fixation technique is principally known before and is further judged to be sufficient to measure the displacement of a tooth according to the present invention. The electromagnetic beam 2a of the source 2 is allowed to be reflected at some part of the tooth or at a delimited tooth surface and the light, in that way reflected from the tooth, is received in a device, being either a recording means or a means from which recording can be obtained by some suitable device. In the illustrated embodiment this device consists of a screen provided with a rectangular coordinate system and a camera, not shown in the drawing, for permanent registration of the picture on the screen 4.

In FIG. 2 is shown how the light pencil 2a at a first position of a tooth will give a reflection picture "a," while a second position b of a tooth will cause a reflection picture "b." The reflection picture a and the reflection picture b are displaced in relation to each other according to the displacement of the tooth. The cause of the displacement of the reflection picture is obvious from the angular geometry according to FIG. 3 where $\beta$ denotes the angle of incidence for the light beam 2a when the tooth is located in the first position a while $\alpha+\beta$ makes the angle of incidence of the light beam to the tooth when this one is located in its other position b.

In FIG. 4 and FIG. 5 is shown a great simplification the reflection picture on the recording means 4 and it is presumed that the reflection pictures are identical. Further practical experiments have shown that the reflection picture from a certain tooth surface is significative, which entails a simplification of the application of the device in that a tooth surface, used earlier for a reflection, can be searched out in a later measurement. In this way it is secured that the measurement will be performed by using a certain tooth surface and with equal conditions besides.

As stated above the experiments which have shown that the tooth surface has a significative structure, which is most obvious if the tooth surface is dry and if the surface is exposed to laser light, which is supposed to be the case in FIG. 4 and 5. In FIG. 4 and 5 a light angle, significative for the surface, has been shown, the apex of which in FIG. 4 is situated approximately in the point 7/13. In FIG. 5 the angle has moved to the point 7,5/14. This displacement is an unambiguous measure of the displacement of the tooth at the two measurements.

It is therefore obvious that the device, significative of the invention, is making use of the fact that a change in the reflection picture, caused by the displacement of the tooth, is evaluable on the recording means 4. The displacement of the tooth is evaluated according to the change of the obtained reflection picture.

As is shown in FIG. 4 and 5 the reflection pictures can be projected on a coordinate system, and by photographing the mutual positions of the reflection pictures can be compared and the displacement of the tooth be evaluated. As in many cases several measurements and measurements during long time are necessary it is possible at the first measurement to photograph the reflection pattern and to make notes of either the coordinates of the light peak or the position of whole the reflection picture, for example by noting greatest and lowest value and/or right and left value.

It will also fall within the scope of the invention to automatize the reading of the position of the reflection picture, which might be carried out by evaluation of the central point of the reflection picture with respect to the light intensity. Then the main point of the first reflection picture might be compared to the main point of the second reflection picture whereby the difference in the coordinates of the main points will indicate the displacement of the tooth. The evaluation of the main points of the reflection picture in the way described above could for instance be carried out by placing light sensitive diods in the cross-point between lines and columns in a coordinate system and that these light sensitive diods either by an electrode bias is made insensitive to surrounding light or that the diods are made frequency sensitive, or alternatively sensitive to polarization direction in what way activated light diods simply can be evaluated and the value for the main point of the reflection picture can be recorded by printing the value on a strip. It is obvious that also other optoelectronical devices could come to use, for instance Vidikon TV-system.

Of course the invention is not restricted to the above stated embodiment, given as an example, but could be subject to modifications within the scope of the following claims.

We claim:

1. Device for measuring the displacement of a tooth in a jawbone by comparing the position of a beam of light reflected from said tooth at a first measurement with the position of said reflected beam at a second measurement, comprising a fixture for locating a jawbone in a predetermined position for successive measurements of said tooth position, light source positioned at a location having a predetermined angular relationship to said fixture, means for directing a beam of light from said light source onto the surface of a tooth whose displacement is to be measured while the jawbone is positioned by said fixture, and a fixed medium for directly receiving the light patterns reflected by the surface of said tooth from siad light source during said successive measurements and for comparing the respective positions of said light patterns as a function of displacement of the tooth.

2. The invention defined in claim 1, wherein said light source comprises means for generating a laser beam.

3. The invention defined in claim 1, wherein said medium for receiving the light pattern reflected from a tooth comprises means for recording photographic images.

4. The invention defined in claim 1, wherein said medium for receiving the light patterns reflected from a tooth comprises a system of fixed coordinates.

5. The invention defined in claim 4, wherein the reflected light pattern of a tooth received on said medium includes a distinctive area characteristic of that tooth, the respective successive positions of said distinctive area corresponding to displacement of said tooth.

6. The invention defined in claim 5, wherein said medium comprises a series of spaced electro-optical devices for generating electrical signals corresponding to the incidence of light reflected by said tooth.

* * * * *